(12) United States Patent
Niu (10) Patent No.: US 11,474,628 B2
(45) Date of Patent: Oct. 18, 2022

(54) TOUCH DISPLAY MODULE, CONTROL METHOD THEREOF AND DISPLAY DEVICE

(71) Applicants: Chengdu BOE Optoelectronics Technology Co., Ltd., Sichuan (CN); BOE Technology Group Co., Ltd., Beijing (CN)

(72) Inventor: Wenxiao Niu, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/203,715

(22) Filed: Mar. 16, 2021

(65) Prior Publication Data
US 2021/0311574 A1 Oct. 7, 2021

(30) Foreign Application Priority Data
Apr. 7, 2020 (CN) .......................... 202010263920.8

(51) Int. Cl.
*G06F 3/041* (2006.01)
*G02B 5/30* (2006.01)

(52) U.S. Cl.
CPC ........... *G06F 3/041* (2013.01); *G02B 5/3025* (2013.01)

(58) Field of Classification Search
None
See application file for complete search history.

(56) References Cited

U.S. PATENT DOCUMENTS

2010/0188341 A1* 7/2010 Shen .................... G02B 27/286 345/173
2019/0064951 A1* 2/2019 Yang ....................... G06F 3/041

* cited by examiner

*Primary Examiner* — Carl Adams
(74) *Attorney, Agent, or Firm* — Ling Wu; Stephen Yang; Ling and Yang Intellectual Property (57) ABSTRACT

A touch display module, a display device and a method for controlling the touch display module to display a predetermined color in a screen-off state are provided. The touch display module includes a display module, a touch module and a circular polarizer which are sequentially stacked. The touch module includes a substrate. A predetermined included angle exists between a direction of a first phase difference generated by ambient light irradiating the substrate and a direction of a second phase difference generated by the ambient light irradiating the circular polarizer, the predetermined included angle makes a sum of the first phase difference and the second phase difference a predetermined phase difference. In a screen-off state of the touch display module, when the ambient light enters the touch display module, the predetermined phase difference enables only light with a predetermined color to be reflected from the touch display module.

20 Claims, 5 Drawing Sheets

TOUCH DISPLAY MODULE, CONTROL METHOD THEREOF AND DISPLAY DEVICE

CROSS-REFERENCE TO RELATED APPLICATION

The present application claims the priority of Chinese Patent Application No. 202010263920.8 filed to the CNIPA on Apr. 7, 2020, the content of which is hereby incorporated by reference.

TECHNICAL FIELD

Embodiments of the present disclosure relate to, but are not limited to, the technical field of display, in particular to a touch display module and a method and a display device for controlling the touch display module to display a predetermined color in a screen-off state.

BACKGROUND

When the screen is turned off, the display device will display the black color of the screen, which has a single color tone and poor visual effect, and cannot meet the needs of users.

SUMMARY

The following is a summary of the subject matter described in detail in the present disclosure. This summary is not intended to limit the protection scope of the claims.

In one aspect of the present disclosure, a touch display module is provided. According to an embodiment of the present disclosure, the touch display module includes a display module, a touch module and a circular polarizer which are sequentially stacked, wherein the touch module includes a substrate, a predetermined included angle exists between a direction of a first phase difference generated by ambient light irradiating the substrate and a direction of a second phase difference generated by the ambient light irradiating the circular polarizer, the predetermined included angle makes a sum of the first phase difference and the second phase difference a predetermined phase difference, and in a screen-off state of the touch display module, when the ambient light enters the touch display module, the predetermined phase difference enables only light with a predetermined color to be reflected from the touch display module.

In an exemplary embodiment, the predetermined included angle is 0 degree to 90 degrees.

In an exemplary embodiment, the predetermined included angle is 0 degree or 90 degrees.

In an exemplary embodiment, the predetermined phase difference is 136 nm to 154 nm.

In an exemplary embodiment, the predetermined phase difference is 151 nm or 143 nm.

In an exemplary embodiment, the touch display module satisfies at least one of the following conditions: when the predetermined included angle is 90 degrees, the predetermined phase difference is 143 nm, and the predetermined wavelength is 605 nm to 700 nm, only red light may be reflected from the touch display module; when the predetermined included angle is 0 degree, the predetermined phase difference is 151 nm, and the predetermined wavelength is 500 nm to 560 nm, only green light may be reflected from the touch display module; and when the predetermined included angle is 0 degree, the predetermined phase difference is 151 nm, and the predetermined wavelength is 450 nm to 480 nm, only blue light may be reflected from the touch display module.

In an exemplary embodiment, the substrate includes a cycloolefin polymer resin layer, and the circular polarizer includes a quarter-wave plate and a polyvinyl alcohol layer which are stacked.

In an exemplary embodiment, the direction of the first phase difference is parallel to a short side of the touch display module, and the direction of the second phase difference is parallel to a long side of the touch display module. The predetermined included angle is 90 degrees, the predetermined phase difference is 143 nm, and only red light may be reflected from the touch display module.

In an exemplary embodiment, the direction of the first phase difference is parallel to a short side of the touch display module, and the direction of the second phase difference is parallel to a short side of the touch display module. The predetermined included angle is 0 degree, the predetermined phase difference is 151 nm, and only green light may be reflected from the touch display module.

In an exemplary embodiment, the direction of the first phase difference is parallel to a long side of the touch display module, and the direction of the second phase difference is parallel to the long side of the touch display module. The predetermined included angle is 0 degree, the predetermined phase difference is 151 nm, and only blue light may be reflected from the touch display module.

In another aspect of the present disclosure, a display device is provided. According to an embodiment of the present disclosure, the display device includes a touch display module. The touch display module includes a display module, a touch module and a circular polarizer which are sequentially stacked, wherein the touch module includes a substrate, a predetermined included angle exists between a direction of a first phase difference generated by ambient light irradiating the substrate and a direction of a second phase difference generated by the ambient light irradiating the circular polarizer, the predetermined included angle makes a sum of the first phase difference and the second phase difference a predetermined phase difference, and in a screen-off state of the touch display module, when the ambient light enters the touch display module, the predetermined phase difference enables only light with a predetermined color to be reflected from the touch display module.

In an exemplary embodiment, the predetermined included angle is 0 degree to 90 degrees.

In an exemplary embodiment, the predetermined phase difference is 136 nm to 154 nm.

In an exemplary embodiment, the touch display module satisfies at least one of the following conditions:
when the predetermined included angle is 90 degrees, the predetermined phase difference is 143 nm, and the predetermined wavelength is 605 nm to 700 nm, only red light may be reflected from the touch display module;
when the predetermined included angle is 0 degree, the predetermined phase difference is 151 nm, and the predetermined wavelength is 500 nm to 560 nm, only green light may be reflected from the touch display module; and
when the predetermined included angle is 0 degree, the predetermined phase difference is 151 nm, and the predetermined wavelength is 450 nm to 480 nm, only blue light may be reflected from the touch display module.

In an exemplary embodiment, the substrate includes a cycloolefin polymer resin layer, and the circular polarizer includes a quarter-wave plate and a polyvinyl alcohol layer which are stacked.

In an exemplary embodiment, the direction of the first phase difference is parallel to a short side of the touch display module, and the direction of the second phase difference is parallel to a long side of the touch display module. The predetermined included angle is 90 degrees, the predetermined phase difference is 143 nm, and only red light may be reflected from the touch display module.

In an exemplary embodiment, the direction of the first phase difference is parallel to a short side of the touch display module, and the direction of the second phase difference is parallel to a short side of the touch display module. The predetermined included angle is 0 degree, the predetermined phase difference is 151 nm, and only green light may be reflected from the touch display module.

In an exemplary embodiment, the direction of the first phase difference is parallel to a long side of the touch display module, and the direction of the second phase difference is parallel to the long side of the touch display module. The predetermined included angle is 0 degree, the predetermined phase difference is 151 nm, and only blue light may be reflected from the touch display module.

In an exemplary embodiment, a color of a shell of the display device is the same as or complementary to a color of the touch display module in a screen-off state.

In another aspect of the present disclosure, a method for controlling a touch display module to display a predetermined color in a screen-off state is provided. According to an embodiment of the disclosure, the touch display module includes a display module, a touch module and a circular polarizer which are sequentially stacked, the touch module includes a substrate, and the method includes: allowing a direction of a first phase difference generated by ambient light irradiating the substrate and a direction of a second phase difference generated by the ambient light irradiating the circular polarizer to have a predetermined included angle therebetween, wherein the predetermined included angle makes a sum of the first phase difference and the second phase difference a predetermined phase difference, and light reflected after the ambient light enters the touch display module is light with a predetermined color.

Other aspects will become apparent upon reading and understanding accompanying drawings and the detailed description.

DETAILED DESCRIPTION

Embodiments of the present disclosure are described in detail below. The embodiments described below are exemplary and are intended to explain the present disclosure only, but should not be construed as limitation to the present disclosure. It should be noted that embodiments in the present disclosure and features in the embodiments may be combined with each other arbitrarily if there is no conflict. The embodiments in which technologies or conditions are not indicated shall be carried out according to technologies or conditions described in literatures in the art or according to a product specification.

When the screen is turned off, the display device will display the black color of the screen, which has a single color tone and poor visual effect, and cannot meet the needs of users.

After a lot of in-depth investigation and experimental verification on the influence of the structure in a touch display module on light, it is found that when ambient light enters the touch display module, the light will be divided into two coherent lights because the ambient light is in contact with the touch display module, and the difference between the phases of these two coherent lights is the phase difference caused by the ambient light entering the touch display module. By controlling the phase difference generated after the whole touch display module is irradiated with ambient light, light with a predetermined color may be reflected from the touch display module in a screen-off state, so that the touch display module displays a predetermined color in the screen-off state. In addition, since the flux of reflected light is very small relative to the light emitted by the touch display module itself, even though the touch display module displays different colors in the screen-off state, the normal display thereof in a screen-on state will not be affected. Specifically, first of all, in the touch display module, ambient light has little influence on the phase difference between two coherent lights separated by the ambient light after irradiating other structures in the touch display module except the circular polarizer and the substrate of the touch display module. Therefore, to adjust the phase difference caused by ambient light passing through the whole touch display module, it is only needed to adjust the phase difference generated by the ambient light passing through the circular polarizer, the phase difference generated by the ambient light passing through the substrate of the touch module, or a sum of the phase differences generated by the ambient light passing through the circular polarizer and the substrate of the touch module. However, since the circular polarizer and the substrate of the touch module are usually commercial products purchased directly from manufacturers, it is difficult to separately adjust the phase difference generated by the ambient light passing through the circular polarizer and the phase difference generated by the ambient light passing through the substrate of the touch module. Therefore, in the embodiment of the present disclosure, the phase difference generated by ambient light passing through the touch display module is adjusted by adjusting a sum of the phase differences generated by the ambient light passing through the circular polarizer and the substrate of the touch module. The adjustment of the sum of the phase differences mentioned above may be implemented by adjusting a direction of a first phase difference generated by ambient light passing through the substrate of the touch module and a direction of a second phase difference generated by the ambient light passing through the circular polarizer (the sum of two mutually parallel phase differences is addition of two numerical values, and the sum of two mutually perpendicular phase differences is subtraction of two numerical values).

Figure 1:
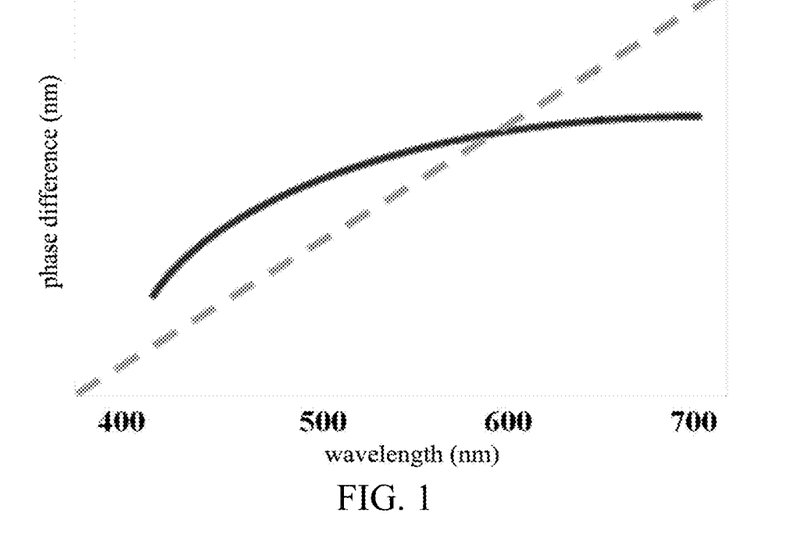
FIG. 1 shows a relation curve between light with different wavelengths reflected when ambient light irradiates a touch display module and a phase difference generated when white light enters the touch display module.
Figure 2:
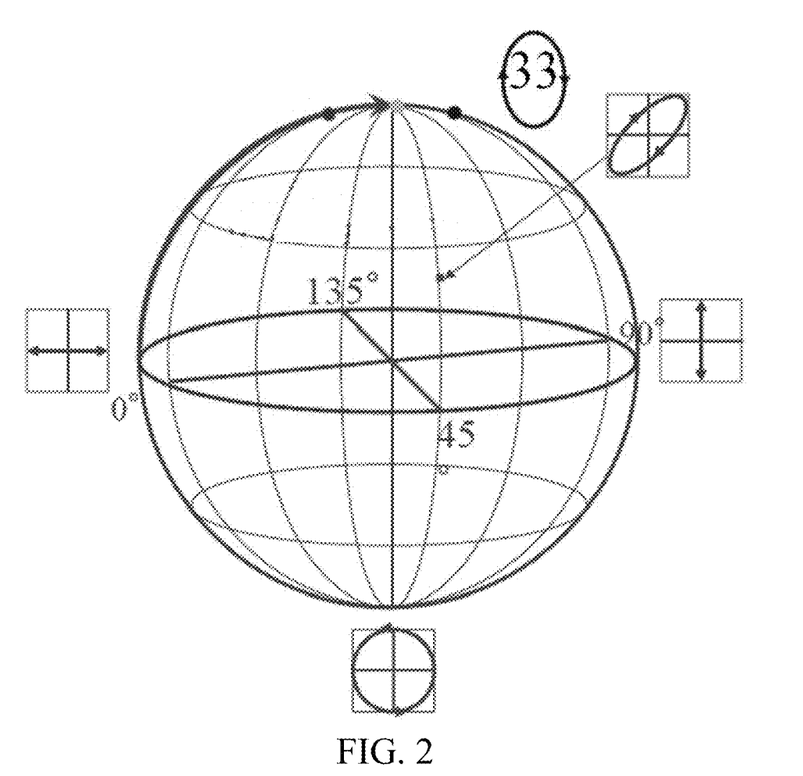
FIG. 2 shows a poincare sphere corresponding to the relation curve between light with different wavelengths reflected when ambient light irradiates the touch display module and a phase difference generated when white light enters the touch display module shown in FIG. 1.

Therefore, an embodiment of the present disclosure intends to provide a touch display module that may display a predetermined color in a screen-off state, so that the display device has a beautiful appearance and meets the aesthetic needs of users. Therefore, after doing a lot of research on the effect of the display device on the ambient light in the screen-off state, it is found that, as shown in the relation curve between light with different wavelengths reflected after entering a touch display module and a phase difference generated when white light enters the touch display module, in an ideal state, when the ambient light (usually white light) irradiates into the touch display module, there is a certain corresponding relationship between the phase difference generated by the ambient light entering the touch display module and the wavelength of the light that may be emitted from the touch display module, that is, after the white light irradiates into the touch display module, it cannot be reflected from the touch display module because of the action of the circular polarizer (that is, light of any wavelength is circularly polarized light, as shown by the dotted line in FIG. 1). However, in practice, not light of any wavelength is circularly polarized light. In practice, the light with long and short wavelengths may be reflected from the touch display module after white light irradiates the touch display module (i.e., some light is elliptically polarized, as shown by the solid line in FIG. 1). It should be noted that in the Poincare sphere shown in FIG. 2, the light at the south pole and the north pole is circularly polarized light, the light at any point except the north and south poles and the equator is elliptically polarized light, and the light at the equator is linearly polarized light. That is to say, in the actual situation shown by the solid line in FIG. 1, only when the correspondence between the phase difference and the wavelength in the actual situation is consistent with the correspondence between the phase difference and the wavelength in the ideal state, that is, the light with the wavelength at the intersection of the solid line and the dotted in FIG. 1, can be absorbed by the touch display module and cannot be reflected from the touch display module. As can be seen from FIG. 1, the wavelength corresponding to the intersection point is a predetermined wavelength between red light and green light. That is to say, in the situation shown in FIG. 1, after ambient light enters the touch display module, the light with the predetermined wavelength is completely circularly polarized light and will be absorbed by the touch display module. Referring to FIG. 2, blue light 33 is elliptically polarized light, and therefore it will be reflected from the touch display module at this time.

Figure 3:
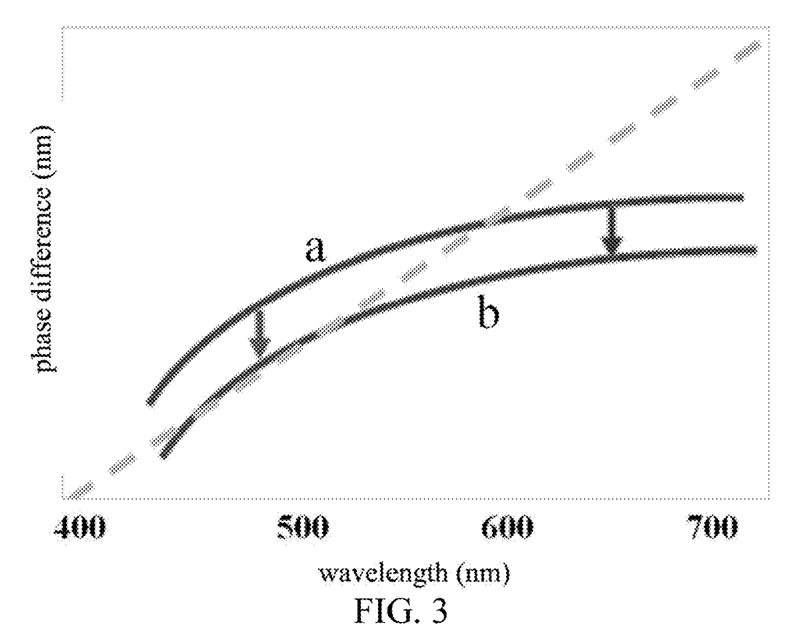
FIG. 3 is a relation curve between light with different wavelengths reflected when ambient light irradiates the touch display module according to an embodiment of the present disclosure and a phase difference generated when white light enters the touch display module.
Figure 4:
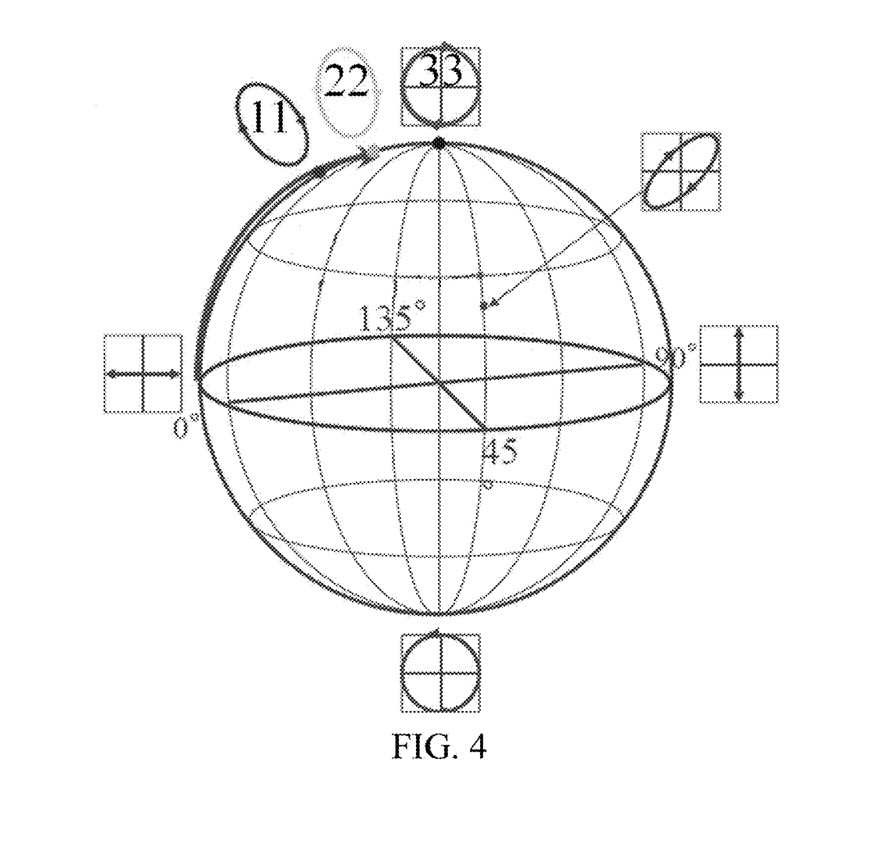
FIG. 4 shows a poincare sphere corresponding to the relation curve between light with different wavelengths reflected when ambient light irradiates the touch display module and a phase difference generated when white light enters the touch display module shown in FIG. 3.

After adjusting the directions of the phase differences generated by the ambient light irradiating the circular polarizer of the touch display module and the substrate of the touch module, when the ambient light irradiates the touch display module, the phase difference generated by the light entering the touch display module still has a certain correspondence with the wavelength of the light that can be emitted from the display module, such as the relation curve between the wavelength of the reflected light after white light enters the module and the phase difference generated when white light enters the touch display module shown in FIG. 3. In this case, since the phase difference generated by ambient light (usually white light) entering the touch display module is adjusted, taking the decrease of the phase difference generated by ambient light entering the touch display module as an example, compared with the solid line a representing relation curve before adjusting the phase difference generated by the ambient light entering the display module, the solid line b representing relation curve after adjusting the phase difference generated by the ambient light entering the display module shown in FIG. 3 moves down as a whole. Therefore, compared with the solid line a, the intersection of the solid line b and the dotted line in FIG. 3 (i.e., the correspondence between the phase difference and the wavelength in the ideal state) has shifted to a lower wavelength. Therefore, in this case, referring to FIG. 4, blue light 33 is circularly polarized light. When the touch display module is in a screen-off state, after the ambient light enters the touch display module, the blue light 33 is absorbed by the touch display module, resulting in that only the red light 11 is reflected from the touch display module.

Figure 5:
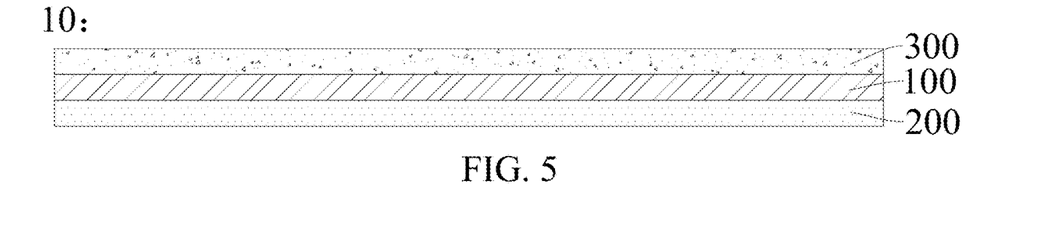
FIG. 5 shows a schematic cross-sectional structure of a touch display module according to an embodiment of the present disclosure.

Based on the above research, in one aspect of the present disclosure, a touch display module is provided. According to an embodiment of the present disclosure, referring to FIGS. 5 and 7, the touch display module 10 includes a display module 200, a touch module 100 and a circular polarizer 300 which are sequentially stacked. The touch module 100 includes a substrate (not shown in the figures). A predetermined included angle θ exists between a direction of a first phase difference 1 generated by ambient light entering the substrate and a direction of a second phase difference 2 generated by the ambient light entering the circular polarizer. The predetermined included angle θ makes a sum of the first phase difference 1 and the second phase difference 2 a predetermined phase difference. When the ambient light enters the touch display module 10 in a screen-off state of the touch display module 10, the predetermined phase difference enables only light with a predetermined color to be reflected from the touch display module 10. Since only light with a predetermined color may be reflected from the touch display module 10 in the screen-off state, the touch display module 10 may display a predetermined color in the screen-off state, which is beautiful in appearance, meets the aesthetic needs of users, and has wide application range and good commercial prospects.

Figure 6:
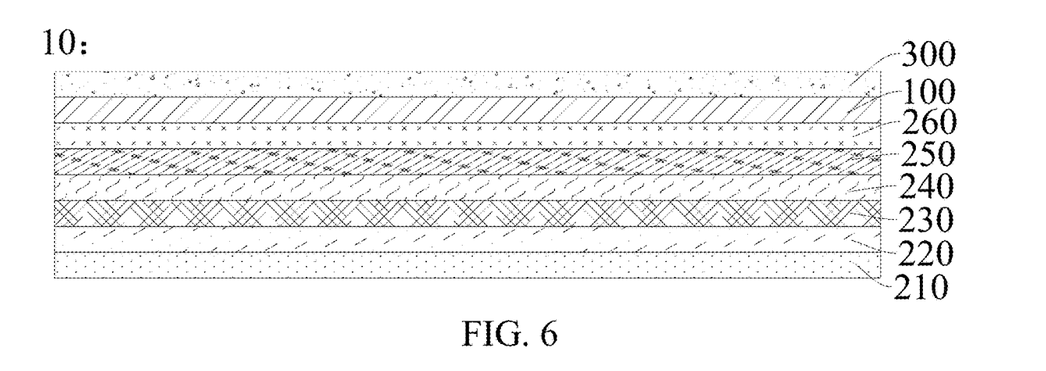
FIG. 6 shows a schematic cross-sectional structure of a touch display module according to another embodiment of the present disclosure.

According to an embodiment of the present disclosure, referring to FIG. 6, the display module in the touch display module includes an anode 210; a hole injection layer 220 disposed on a surface of the anode 210 close to the touch module 100; a hole transport layer 230 disposed on a surface of the hole injection layer 220 close to the touch module 100; an electron emission layer 240 disposed on a surface of the hole transport layer 230 close to the touch module 100 and including an organic light emitting material for emitting light; an electron transport layer 250 disposed on a surface of the electron emission layer 240 close to the touch module 100; and a cathode 260 disposed on a surface of the electron transport layer 250 close to the touch module 100. When the touch display module 10 is in a screen-off state, ambient light will be reflected from the surface of the anode 210 after irradiating the touch display module 10. After passing through the circular polarizer 300 and the substrate of the touch module 100, because the circular polarizer 300 and the substrate of the touch module 100 as a whole has a predetermined phase difference, only light of a predetermined wavelength (i.e., light of a predetermined color) will be emitted from the touch display module 10, thus enabling the touch display module 10 to display a predetermined color in the screen-off state.

Figure 7:
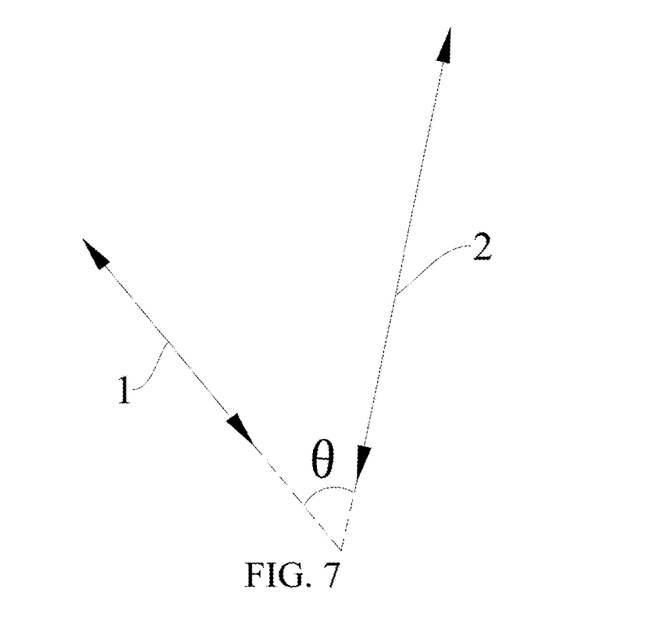
FIG. 7 shows a schematic diagram of a predetermined included angle between a direction of a first phase difference and a direction of a second phase difference according to an embodiment of the present disclosure.

According to an embodiment of the present disclosure, referring to FIG. 7, the predetermined included angle θ between the first phase difference 1 and the second phase difference 2 is 0 degree to 90 degrees. Therefore, the touch display module 10 may display a variety of different colors in the screen-off state, such as red, orange, yellow, green, cyan, blue or purple, etc. The touch display module 10 may achieve a wide variety of colors in the screen-off state, which may better enhance the appearance of the touch display module 10.

In some exemplary embodiments of the present disclosure, the predetermined included angle may be 0 degree or 90 degrees. Therefore, the touch display module 10 may display three primary colors (i.e., red, green and blue) in the screen-off state, with simple process, low cost, convenient operation, easy implementation and easy industrialization.

According to an embodiment of the present disclosure, the predetermined phase difference may be 136 nm to 154 nm. In an exemplary embodiment, it may include 136 nm, 137 nm, 138 nm, 139 nm, 140 nm, 141 nm, 142 nm, 143 nm, 144 nm, 145 nm, 146 nm, 147 nm, 148 nm, 149 nm, 150 nm, 151 nm, 152 nm, 153 nm or 154 nm. Therefore, by ranging the predetermined phase difference within the above range, after the ambient light enters the touch display module, only the light with the predetermined color may be reflected from the touch display module, and the color is purer than when the predetermined phase difference is not limited, so that the touch display module 10 may further display the predetermined color. In addition, the phase differences generated by ambient light irradiating the circular polarizer and the substrate are the nature of the circular polarizer and the substrate of the touch module themselves, and the combination of the circular polarizer and the substrate may bring about the predetermined phase difference within the above range, the nature of the forming materials of the circular polarizer and the substrate of the touch module is skillfully utilized, which is easy to manufacture and low in cost.

In some exemplary embodiments of the present disclosure, the predetermined phase difference is 151 nm or 143 nm. Therefore, the touch display module 10 may display three primary colors (i.e., red, green and blue) in the screen-off state, with simple process, low cost, convenient operation, easy implementation and easy industrialization.

According to an embodiment of the present disclosure, the first phase difference may be 2 nm to 6 nm. In an exemplary embodiment, it may be 2 nm, 3 nm, 4 nm, 5 nm or 6 nm. Therefore, the material for the substrate of the touch module with the above first phase difference is widely sourced, easily available and low in cost. In addition, it is easy to manufacture and simple in process, and may be well combined with the circular polarizer in the touch display module to obtain the predetermined phase difference.

According to an embodiment of the present disclosure, the second phase difference may be 140 nm to 150 nm. In an exemplary embodiment, it may include 140 nm, 141 nm, 142 nm, 143 nm, 144 nm, 145 nm, 146 nm, 147 nm, 148 nm, 149 nm or 150 nm. Therefore, the material for the circular polarizer with the above second phase difference is widely sourced, easily available and low in cost. In addition, it is easy to manufacture and simple in process, and may be well combined with the substrate in the touch module to obtain the predetermined phase difference.

In some embodiments of the present disclosure, the substrate may include a cycloolefin polymer resin layer (COP), and the circular polarizer may include a quarter-wave plate and a polyvinyl alcohol layer (PVA) which are stacked. Therefore, the material is widely sourced, easily available and low in cost, and effectively enables the touch display module to have the above-mentioned predetermined phase difference.

According to an embodiment of the present disclosure, the way of controlling the direction of the first phase difference generated by the ambient light irradiating the substrate and the direction of the second phase difference generated by the ambient light irradiating the circular polarizer is not limited. For example, in some embodiments of the present disclosure, it may be implemented by changing a stretching direction or contraction direction of the substrate and the circular polarizer when the substrate and the circular polarizer are formed. In the forming process, the stretching direction or contraction direction of the substrate and the circular polarizer is the direction of the phase difference generated after the ambient light irradiates the substrate or the circular polarizer. Therefore, the substrates and circular polarizers with different directions of phase difference may be better manufactured.

Figure 8:
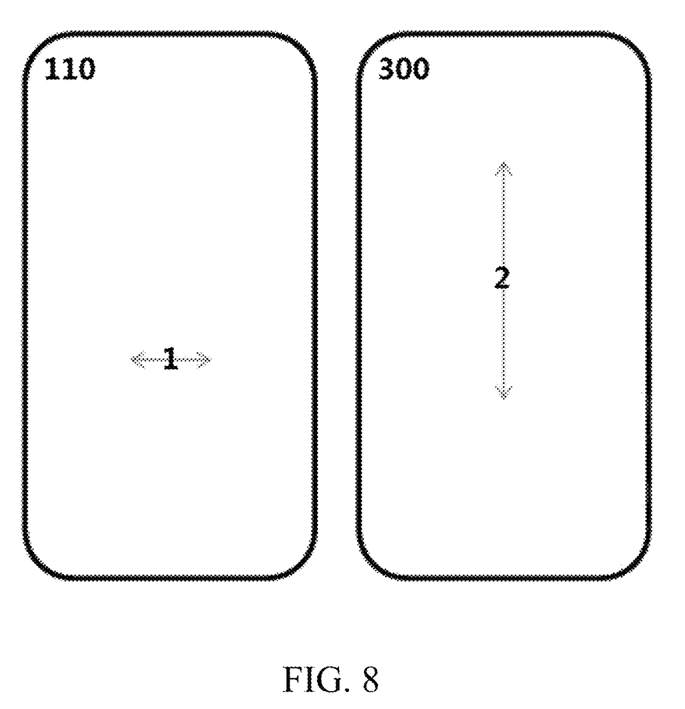
FIG. 8 shows a schematic diagram of a direction of a first phase difference and a direction of a second phase difference in a touch display module according to an exemplary embodiment of the present disclosure.

According to an embodiment of the present disclosure, in the touch display module, when the predetermined included angle is 90 degrees, the predetermined phase difference is 143 nm, and the predetermined wavelength is 605 nm to 700 nm, only red light may be reflected from the touch display module (see FIG. 8 for a schematic diagram of a direction of a first phase difference 1 and a direction of a second phase difference 2). When the predetermined included angle is 0 degree, the predetermined phase difference is 151 nm, and the predetermined wavelength is 500 nm to 560 nm, only green light may be reflected from the touch display module (see FIG. 9 for a schematic diagram of a direction of a first phase difference 1 and a direction of a second phase difference 2). When the predetermined included angle is 0 degree, the predetermined phase difference is 151 nm, and the predetermined wavelength is 450 nm to 480 nm, only blue light may be reflected from the touch display module (see FIG. 10 for a schematic diagram of a direction of a first phase difference 1 and a direction of a second phase difference 2). Therefore, in the screen-off state of the touch display module, when ambient light enters the touch display module, the predetermined phase difference enables only light with a predetermined color to be reflected from the touch display module 10. The touch display module 10 may display a predetermined color in the screen-off state, which is beautiful in appearance, meets the aesthetic needs of users, and has wide application range and good commercial prospects.

In an exemplary embodiment of the present disclosure, referring to FIG. 8, the direction of the first phase difference 1 is parallel to a short side of the touch display module, the direction of the second phase difference 2 is parallel to a long side of the touch display module, the predetermined included angle is 90 degrees, the predetermined phase difference is 143 nm, the predetermined wavelength is 605 nm to 700 nm, and only red light may be reflected from the touch display module. In this embodiment, since the direction of the first phase difference 1 generated by ambient light irradiating the substrate 110 and the direction of the second phase difference 2 generated by the ambient light irradiating the circular polarizer 300 are perpendicular to each other, and the direction of the first phase difference 1 is different from that the second phase difference 2. Upon the addition, the predetermined phase difference generated by ambient light irradiating the whole touch display module is reduced. Compared with the solid line a representing relation curve before adjusting the phase difference generated by the ambient light irradiating the display module, the solid line b representing relation curve after adjusting the phase difference generated by the ambient light entering the display module shown in FIG. 3 moves down as a whole. Therefore, compared with the solid line a, the intersection of the solid line b and the dotted line in FIG. 3 (i.e., the correspondence between the phase difference and the wavelength in an ideal state) moves to a lower wavelength. Therefore, in this case, referring to FIG. 4, blue light 33 is circularly polarized light. When the touch display module is in a screen-off state, after the ambient light enters the touch display module, blue light 33 is absorbed by the touch display module, resulting in that only red light 11 is reflected from the touch display module.

Figure 9:
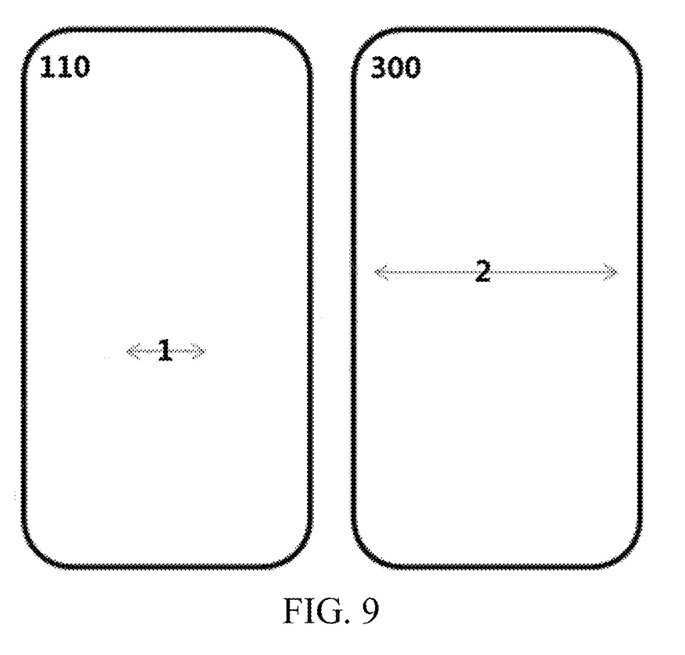
FIG. 9 shows a schematic diagram of a direction of a first phase difference and a direction of a second phase difference in a touch display module according to another exemplary embodiment of the present disclosure.

In another exemplary embodiment of the present disclosure, referring to FIG. 9, the direction of the first phase difference 1 is parallel to a short side of the touch display module, the direction of the second phase difference 2 is parallel to the short side of the touch display module, the predetermined included angle is 0 degree, the predetermined phase difference is 151 nm, and the predetermined wavelength is 500 nm to 560 nm, and only green light may be reflected from the touch display module. In this embodiment, since the direction of the first phase difference 1 generated by the ambient light irradiating the substrate 110 and the direction of the second phase difference 2 generated by the ambient light irradiating the circular polarizer 300 are parallel to each other, the direction of the first phase difference 1 is the same as that of the second phase difference 2. Upon the addition, the predetermined phase difference generated by the ambient light irradiating the whole touch display module is increased. Compared with the relation curve before adjusting the phase difference generated by the ambient light irradiating the display module, the solid line shown in FIG. 1 moves up as a whole. As a result, the intersection of the solid line that moves up and the dotted line in FIG. 1 (that is, the correspondence between the phase difference and the wavelength in an ideal state) moves to a higher wavelength. Therefore, in this case, the circularly polarized light is red light. When the touch display module is in a screen-off state, red light is absorbed by the touch display module after ambient light enters the touch display module. In addition, since the user usually observes the touch display module from the angle shown in FIG. 9 when using it, when the directions of the first phase difference 1 and the second phase difference 2 are parallel to the short sides of the touch display module, the color of the touch display module 10 observed by the user is green.

Figure 10:
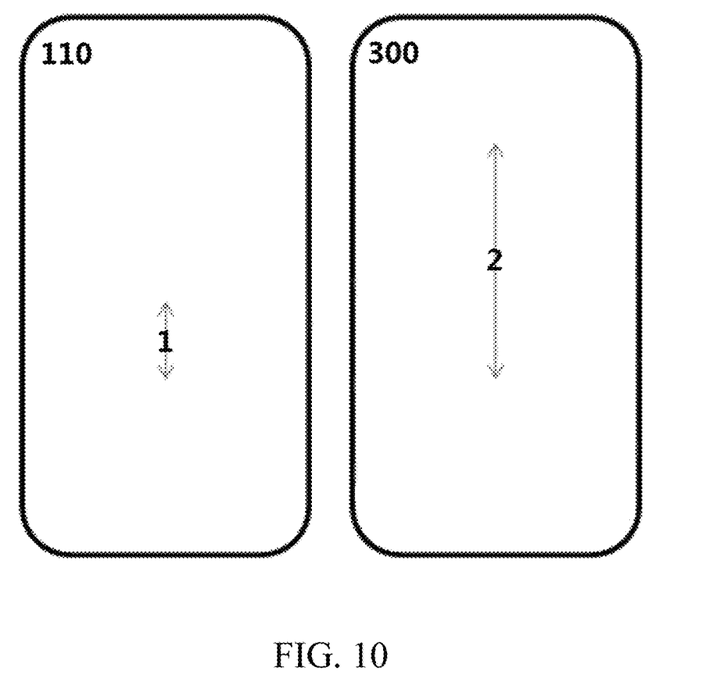
FIG. 10 shows a schematic diagram of a direction of a first phase difference and a direction of a second phase difference in a touch display module according to another exemplary embodiment of the present disclosure.

In another exemplary embodiment of the present disclosure, referring to FIG. 10, the direction of the first phase difference 1 is parallel to a long side of the touch display module, the direction of the second phase difference 2 is parallel to the long side of the touch display module, the predetermined included angle is 0 degree, the predetermined phase difference is 151 nm, the predetermined wavelength is 450 nm to 480 nm, and only blue light may be reflected from the touch display module. In this embodiment, since the direction of the first phase difference 1 generated by ambient light irradiating the substrate 110 and the direction of the second phase difference 2 generated by the ambient light irradiating the circular polarizer 300 are parallel to each other, the direction of the first phase difference 1 is the same as that of the second phase difference 2. Upon the addition, the predetermined phase difference generated by the ambient light irradiating the whole touch display module is increased. Compared with the relation curve before adjusting the phase difference generated by the ambient light irradiating the display module, the solid line shown in FIG. 1 moves up as a whole. As a result, the intersection of the solid line that moves up and the dotted line (that is, the correspondence between the phase difference and the wavelength in an ideal state) in FIG. 1 moves to a higher wavelength. Therefore, in this case, the circularly polarized light is red light. When the touch display module is in a screen-off state, red light is absorbed by the touch display module after the ambient light enters the touch display module. In addition, since the user usually observes the touch display module from the angle shown in FIG. 10 when using it, as mentioned above, when the directions of the first phase difference 1 and the second phase difference 2 are both parallel to the long side of the touch display module, the color of the touch display module 10 observed by the user is blue. When the directions of the first phase difference 1 and the second phase difference 2 are both parallel to the short side or the long side of the touch display module, the reasons why the color of the touch display module 10 observed by the user is different are as follows: according to the optical principle, the phase difference of the quarter-wave plate in the circular polarizer is $\lambda/4$ under the positive viewing angle, and the observed color will be black under the positive viewing angle (i.e., when observing perpendicular to the touch display module). However, when the observation angle is inclined, with the viewing angle becomes lower, the value of the phase difference will decrease with the change of observation angle, and the phase difference of quarter-wave plate is less than $\lambda/4$. When the inclination angle reaches 45°, the phase difference is basically unchanged with the change of viewing angle. Therefore, the observed colors are different when the touch display module is rotated in different directions.

Figure 11:
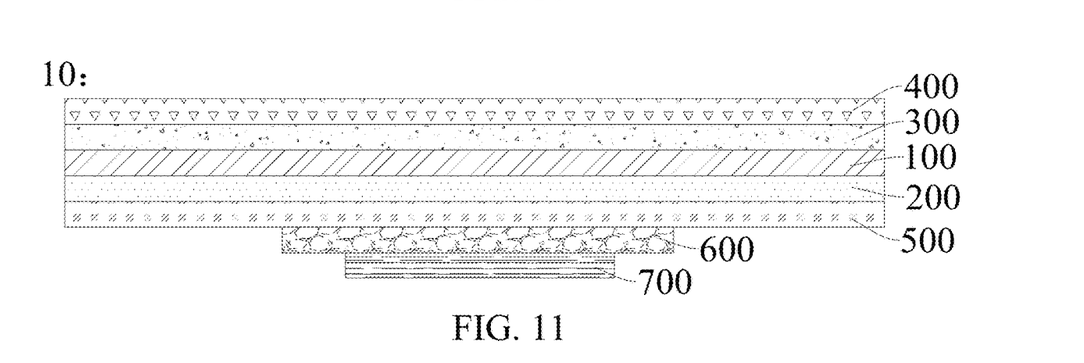
FIG. 11 shows a schematic cross-sectional structure of a touch display module according to another embodiment of the present disclosure.

According to an embodiment of the present disclosure, in addition to the aforementioned structures, referring to FIG. 11, the touch display module 10 may further include, for example, a cover plate 400 disposed on a surface of the circular polarizer 300 away from the touch module 100; a heat dissipation film 500 disposed on a surface of the display module 200 away from the touch module 100; a first flexible circuit board 600 disposed on a surface of the heat dissipation film 500 away from the display module 200; a second flexible circuit board 700 disposed on a surface of the first flexible circuit board 600 away from the heat dissipation film 500. In addition, the touch display module 10 may further include the structures and components of other conventional touch display modules, which will not be described in detail here.

In another aspect of the present disclosure, a display device is provided. According to an embodiment of the present disclosure, the display device includes the aforementioned touch display module. Since only light with a predetermined color may be reflected from the touch display module in the display device in the screen-off state, the display device may display a predetermined color in the screen-off state, which is beautiful in appearance, meets the aesthetic needs of users, and has wide application range and good commercial prospects.

According to an embodiment of the present disclosure, a color of a shell of the display device may be arbitrarily matched with a color of the touch display module in screen-off state, wherein when the color of the shell of the display device may be the same as or complementary to the color of the touch display module in screen-off state, the visual effect of the display device in the screen-off state is better.

According to an embodiment of the present disclosure, the display device may include other needed structures and components in addition to the aforementioned display backplane, which may be supplemented and designed by those skilled in the art according to the types and use requirements of the display device, and will not be described in detail here.

According to an embodiment of the present disclosure, the types of the display device are not limited, including but not limited to mobile phones, tablet computers, televisions, vehicle-mounted displays, wearable devices, game machines, and the like. Therefore, the application range is wide.

In another aspect of the present disclosure, a method for controlling a touch display module to display a predetermined color in a screen-off state is provided. According to an embodiment of the present disclosure, referring to FIG. 5, the touch display module 10 includes a display module 200, a touch module 100 and a circular polarizer 300 which are sequentially stacked. The touch module 100 includes a substrate (not shown in the figure). Referring to FIG. 7, the method includes: making a direction of a first phase difference 1 generated by ambient light irradiating the substrate and a direction of a second phase difference 2 generated by the ambient light irradiating the circular polarizer have a predetermined included angle θ therebetween, wherein the predetermined included angle θ makes a sum of the first phase difference 1 and the second phase difference 2 a predetermined phase difference, so that light reflected after the ambient light enters the touch display module is light with a predetermined color.

According to an embodiment of the present disclosure, the directions of phase differences generated when ambient light passes through the substrate and the circular polarizer may be adjusted by changing a stretching direction or contraction direction of the substrate and the circular polarizer when the substrate and the circular polarizer are formed. In the forming process, the stretching direction or contraction direction of the substrate or the circular polarizer is the direction of the phase difference generated after the ambient light irradiates the substrate or the circular polarizer.

According to an embodiment of the present disclosure, after ambient light enters the touch display module, the predetermined phase difference enables only light with a predetermined color to be reflected from the touch display module. The touch display module may display a predetermined color in the screen-off state, which has beautiful appearance, meets the aesthetic needs of users, wide application range and good commercial prospects.

In the description of the present disclosure, it should be understood that the terms "first" and "second" are used for the purpose of description only, and cannot be understood as indication or implication of relative importance or implicit indication of the number of the mentioned technical features. Thus, features defined by "first" and "second" may include one or more of the features explicitly or implicitly. In the description of the present disclosure, the meaning of "a plurality of" is two or more than two, unless defined otherwise explicitly.

In the present disclosure, unless otherwise clearly specified and defined, the first feature being "on" or "under" the second feature may mean that the first and second features are in direct contact, or the first and second features are in indirect contact through an intermediary. Moreover, the first feature being "over", "above" and "on" the second feature may mean that the first feature is directly above or obliquely above the second feature, or simply mean that a level of the first feature is greater than that of the second feature. The first feature being "below", "beneath" and "under" the second feature may mean that the first feature is directly below or obliquely below the second feature, or simply mean that a level of the first feature is less than that of the second feature.

In the description of the specification, description made with reference to terms "an embodiment", "some embodiments", "an example" or "some examples" means that a feature, structure, material, or characteristic described in connection with the embodiment or example is included in at least one embodiment or example of the present disclosure. In this specification, the schematic expression of the above-mentioned terms is not necessarily directed to the same embodiment or example. Moreover, the feature, structure, material, or characteristic described may be combined in a proper way in any one or more embodiments or examples. In addition, without conflict, those skilled in the art may incorporate and combine different embodiments or examples and features of the different embodiments or examples described in this specification.

Although the embodiments of the present disclosure have been shown and described above, it should be understood that the above embodiments are exemplary, and will not be understood as the limitation to the present disclosure. Alterations, modifications, substitutions and variations to the above embodiments may be made by those skilled in the art within the scope of the present disclosure.

What we claim is:
1. A touch display module, comprising:
a display module, a touch module and a circular polarizer which are sequentially stacked, wherein the touch module comprises a substrate, a predetermined included angle exists between a direction of a first phase difference generated by ambient light irradiating the substrate and a direction of a second phase difference generated by the ambient light irradiating the circular polarizer, the predetermined included angle makes a sum of the first phase difference and the second phase difference a predetermined phase difference, and in a screen-off state of the touch display module, when the ambient light enters the touch display module, the predetermined phase difference enables only light with a predetermined color to be reflected from the touch display module.

2. The touch display module according to claim 1, wherein the predetermined included angle is 0 degree to 90 degrees.

3. The touch display module according to claim 2, wherein the predetermined included angle is 0 degree or 90 degrees.

4. The touch display module according to claim 1, wherein the predetermined phase difference ranges from 136 nm to 154 nm.

5. The touch display module according to claim 4, wherein the predetermined phase difference is 151 nm or 143 nm.

6. The touch display module according to claim 1, wherein the touch display module satisfies at least one of the following conditions:
   when the predetermined included angle is 90 degrees, the predetermined phase difference is 143 nm, and the predetermined wavelength is 605 nm to 700 nm, only red light may be reflected from the touch display module;
   when the predetermined included angle is 0 degree, the predetermined phase difference is 151 nm, and the predetermined wavelength is 500 nm to 560 nm, only green light may be reflected from the touch display module; and
   when the predetermined included angle is 0 degree, the predetermined phase difference is 151 nm, and the predetermined wavelength is 450 nm to 480 nm, only blue light may be reflected from the touch display module.

7. The touch display module according to claim 6, wherein the direction of the first phase difference is parallel to a short side of the touch display module, the direction of the second phase difference is parallel to a long side of the touch display module, the predetermined included angle is 90 degrees, the predetermined phase difference is 143 nm, and only red light may be reflected from the touch display module.

8. The touch display module according to claim 6, wherein the direction of the first phase difference is parallel to a short side of the touch display module, the direction of the second phase difference is parallel to a short side of the touch display module, the predetermined included angle is 0 degree, the predetermined phase difference is 151 nm, and only green light may be reflected from the touch display module.

9. The touch display module according to claim 6, wherein the direction of the first phase difference is parallel to a long side of the touch display module, the direction of the second phase difference is parallel to the long side of the touch display module, the predetermined included angle is 0 degree, the predetermined phase difference is 151 nm, and only blue light may be reflected from the touch display module.

10. The touch display module according to claim 1, wherein the substrate comprises a cycloolefin polymer resin layer; and the circular polarizer comprises a quarter-wave plate and a polyvinyl alcohol layer which are stacked.

11. A display device, comprising:
   a touch display module comprising a display module, a touch module and a circular polarizer which are sequentially stacked, wherein the touch module comprises a substrate, a predetermined included angle exists between a direction of a first phase difference generated by ambient light irradiating the substrate and a direction of a second phase difference generated by the ambient light irradiating the circular polarizer, the predetermined included angle makes a sum of the first phase difference and the second phase difference a predetermined phase difference, and in a screen-off state of the touch display module, when the ambient light enters the touch display module, the predetermined phase difference enables only light with a predetermined color to be reflected from the touch display module.

12. The display device according to claim 11, wherein the predetermined included angle is 0 degree to 90 degrees.

13. The display device according to claim 11, wherein the predetermined phase difference ranges from 136 nm to 154 nm.

14. The display device according to claim 11, wherein the touch display module satisfies at least one of the following conditions:
   when the predetermined included angle is 90 degrees, the predetermined phase difference is 143 nm, and the predetermined wavelength is 605 nm to 700 nm, only red light may be reflected from the touch display module;
   when the predetermined included angle is 0 degree, the predetermined phase difference is 151 nm, and the predetermined wavelength is 500 nm to 560 nm, only green light may be reflected from the touch display module; and
   when the predetermined included angle is 0 degree, the predetermined phase difference is 151 nm, and the predetermined wavelength is 450 nm to 480 nm, only blue light may be reflected from the touch display module.

15. The display device according to claim 14, wherein the direction of the first phase difference is parallel to a short side of the touch display module, the direction of the second phase difference is parallel to a long side of the touch display module, the predetermined included angle is 90 degrees, the predetermined phase difference is 143 nm, and only red light may be reflected from the touch display module.

16. The display device according to claim 14, wherein the direction of the first phase difference is parallel to a short side of the touch display module, the direction of the second phase difference is parallel to the short side of the touch display module, the predetermined included angle is 0 degree, the predetermined phase difference is 151 nm, and only green light may be reflected from the touch display module.

17. The display device according to claim 14, wherein the direction of the first phase difference is parallel to a long side of the touch display module, the direction of the second phase difference is parallel to the long side of the touch display module, the predetermined included angle is 0 degree, the predetermined phase difference is 151 nm, and only blue light may be reflected from the touch display module.

18. The display device according to claim 11, wherein the substrate comprises a cycloolefin polymer resin layer; and the circular polarizer comprises a quarter-wave plate and a polyvinyl alcohol layer which are stacked.

19. The display device according to claim 11, wherein a color of a shell of the display device is the same as or complementary to a color of the touch display module in the screen-off state.

20. A method for controlling a touch display module to display a predetermined color in a screen-off state, wherein the touch display module comprises a display module, a touch module and a circular polarizer which are sequentially stacked, the touch module comprises a substrate, and the method comprises:

allowing a direction of a first phase difference generated by ambient light irradiating the substrate and a direction of a second phase difference generated by the ambient light irradiating the circular polarizer to have a predetermined included angle therebetween, wherein the predetermined included angle makes a sum of the first phase difference and the second phase difference a predetermined phase difference, and light reflected after the ambient light enters the touch display module is light with a predetermined color.

\* \* \* \* \*